United States Patent
Hsieh et al.

(10) Patent No.: US 8,873,005 B2
(45) Date of Patent: Oct. 28, 2014

(54) METHOD FOR MANUFACTURING ALIGNMENT LAYER

(71) Applicant: Chunghwa Picture Tubes, Ltd., Taoyuan (TW)

(72) Inventors: Chia-Sheng Hsieh, Taichung (TW); Hsin-Min Fu, Taoyuan County (TW); Hung-Yu Wu, New Taipei (TW); Jan-Tian Lian, Keelung (TW)

(73) Assignee: Chunghwa Picture Tubes, Ltd., Taoyuan County (TW)

( * ) Notice: Subject to any disclaimer, the term of this patent is extended or adjusted under 35 U.S.C. 154(b) by 179 days.

(21) Appl. No.: 13/728,986

(22) Filed: Dec. 27, 2012

(65) Prior Publication Data

US 2014/0146280 A1    May 29, 2014

(30) Foreign Application Priority Data

Nov. 28, 2012    (TW) .............................. 101144539 A

(51) Int. Cl.
   *G02F 1/1337*    (2006.01)
(52) U.S. Cl.
   CPC ................................ *G02F 1/133788* (2013.01)
   USPC ............................ 349/123; 349/124; 349/129

(58) Field of Classification Search
   CPC ............ G02F 1/1337; G02F 1/133711; G02F 1/134363; G02F 1/133788; G02F 1/133753; G02F 1/133707; G02F 1/1393
   USPC .......................................... 349/123, 124, 129
   See application file for complete search history.

(56) References Cited

U.S. PATENT DOCUMENTS

| | | | |
|---|---|---|---|
| 7,156,530 B2 * | 1/2007 | Miyatake et al. | 359/614 |
| 2010/0328778 A1 * | 12/2010 | Mimura et al. | 359/614 |
| 2013/0065333 A1 * | 3/2013 | Zhuang et al. | 438/30 |

FOREIGN PATENT DOCUMENTS

TW    201106068    2/2011

* cited by examiner

*Primary Examiner* — Mike Qi
(74) *Attorney, Agent, or Firm* — Jianq Chyun IP Office

(57) ABSTRACT

A method for manufacturing an alignment layer is provided. An alignment material having an ultraviolet reactive functional group is formed on a substrate. A pre-baking process is performed on the alignment material located on the substrate. An ultraviolet polarizer is provided on the substrate. An aligning process is performed on the pre-baked alignment material, so as to irradiate an ultraviolet light to the substrate. The ultraviolet light passes through the ultraviolet polarizer and irradiates to the pre-baked alignment material. A post-baking process is performed on the alignment material after being aligned, so as to fully cure the alignment material.

9 Claims, 3 Drawing Sheets

METHOD FOR MANUFACTURING ALIGNMENT LAYER

CROSS-REFERENCE TO RELATED APPLICATION

This application claims the priority benefit of Taiwan application serial no. 101144539, filed on Nov. 28, 2012. The entirety of the above-mentioned patent application is hereby incorporated by reference herein and made a part of this specification.

BACKGROUND OF THE INVENTION

1. Field of the Invention

The invention relates to a method for manufacturing an alignment layer, and more particularly, to a method for manufacturing a photo alignment layer.

2. Description of Related Art

One common liquid crystal panel is mainly composed of two substrates and a liquid crystal layer disposed between the two substrates. Regardless of whether an active matrix liquid crystal display or a passive matrix liquid crystal display is applied, an alignment layer is required to be provided on the two substrates. The alignment layer is applied to align liquid crystal molecules, in order for the liquid crystal molecules to represent as being twisted between the two substrates. Generally speaking, the alignment layer can be formed by applying the printing process or other processes, wherein the process for forming the alignment layer in the printing manner mainly includes an alignment layer printing and an aligning process. In the step of the alignment layer printing, polyimide is usually manufactured on the substrate by the printing equipment, and in the step of the aligning process, the aligning process is performed by a directional rubbing.

More specifically, the directional rubbing means that a rubbing process is performed on the alignment layer in a contact manner, such that the alignment layer generates the aligning effect for the liquid crystal molecules of the liquid crystal layer. However, such method is required a roller to perform an alignment rubbing process on a surface of a glass substrate. In this way, a multi-domain alignment can not be performed for each of the pixels, and thus the effect of wide view can not be achieved. Furthermore, dust or static electricity may be easily generated on the alignment layer by the manufacturing method, in the contact manner. Additionally, since the roller is required for performing the alignment on the glass substrate, such method can not be easily applied to the large-sized panel fabrication under the circumstances that the size of the glass substrate gradually increases, so that uneven alignment can be easily occurred.

SUMMARY OF THE INVENTION

Accordingly, the invention is directed to a method for manufacturing an alignment layer, which may reduce the occurrence of uneven alignment and dark state light leakage, thereby having a more preferable process yield rate and achieving the effect of wide view.

The invention provides a method for manufacturing an alignment layer. The method includes the following steps. An alignment material having an ultraviolet reactive functional group is formed on a substrate. A pre-baking process is performed on the alignment material located on the substrate. An ultraviolet polarizer is provided on the substrate, wherein the ultraviolet polarizer includes a metal phase wire grid polarizer. An aligning process is performed on the pre-baked alignment material, so as to irradiate an ultraviolet light to the substrate. The ultraviolet light passes through the ultraviolet polarizer and irradiates to the pre-baked alignment material. A post-baking process is performed on the alignment material after being aligned, so as to fully cure the alignment material.

According to an embodiment of the invention, a duration of the pre-baking process is between 1 minute and 30 minutes, and a temperature of the pre-baking process is between 50° C. and 150° C.

According to an embodiment of the invention, a wavelength of the ultraviolet light is between 200 nanometers and 400 nanometers, an energy of the ultraviolet light is between 0.1 joules and 3 joules, and an irradiation time of the ultraviolet light is between 1 second and 1000 seconds.

According to an embodiment of the invention, a material of the alignment material includes a polymeric material having a photo reactive functional group.

According to an embodiment of the invention, a duration of the post-baking process is between 1 minute and 50 minutes, and a temperature of the post-baking process is between 150° C. and 400° C.

According to an embodiment of the invention, the method for manufacturing the alignment layer further includes: a washing process is performed on the cured alignment material.

According to an embodiment of the invention, the washing process is to wash the cured alignment material via a washing solution. The washing solution is constituted of an aqueous solution and an isopropanol solution, and the percentage by weight of isopropanol is between 15% and 60%.

According to an embodiment of the invention, the substrate includes a colour filter substrate or an active device array substrate.

According to an embodiment of the invention, a variation for the ultraviolet reactive functional group of the alignment material is detected by a Fourier transform infrared spectrum analyzer.

Based on the above, in the invention, the method for manufacturing the alignment layer is adopted to the alignment material having the ultraviolet reactive functional group. The ultraviolet light passes through the ultraviolet polarizer firstly and irradiates to the pre-baked alignment material, and then the post-baking process is performed to cure the alignment material. Therefore, the alignment layer manufactured in the invention can have a more preferable aligning effect. Furthermore, as compared with the conventional aligning method (that is adopted to the contact type), the method for manufacturing the alignment layer in the invention may effectively reduce the probability of the alignment layer being damaged and prevent the poor alignment and dark state light leakage caused by the generated static electricity or the powders and particles. Accordingly, the method for manufacturing the alignment layer in the invention may have a more preferable process yield rate.

In order to make the aforementioned features and advantages of the invention more comprehensible, embodiments accompanying figures are described in detail below.

BRIEF DESCRIPTION OF THE DRAWINGS

The accompanying drawings are included to provide further understanding and are incorporated in and constitute a part of this specification. The drawings illustrate exemplary embodiments and, together with the description, serve to explain the principles of the invention.

DESCRIPTION OF EMBODIMENTS

Figure 1:
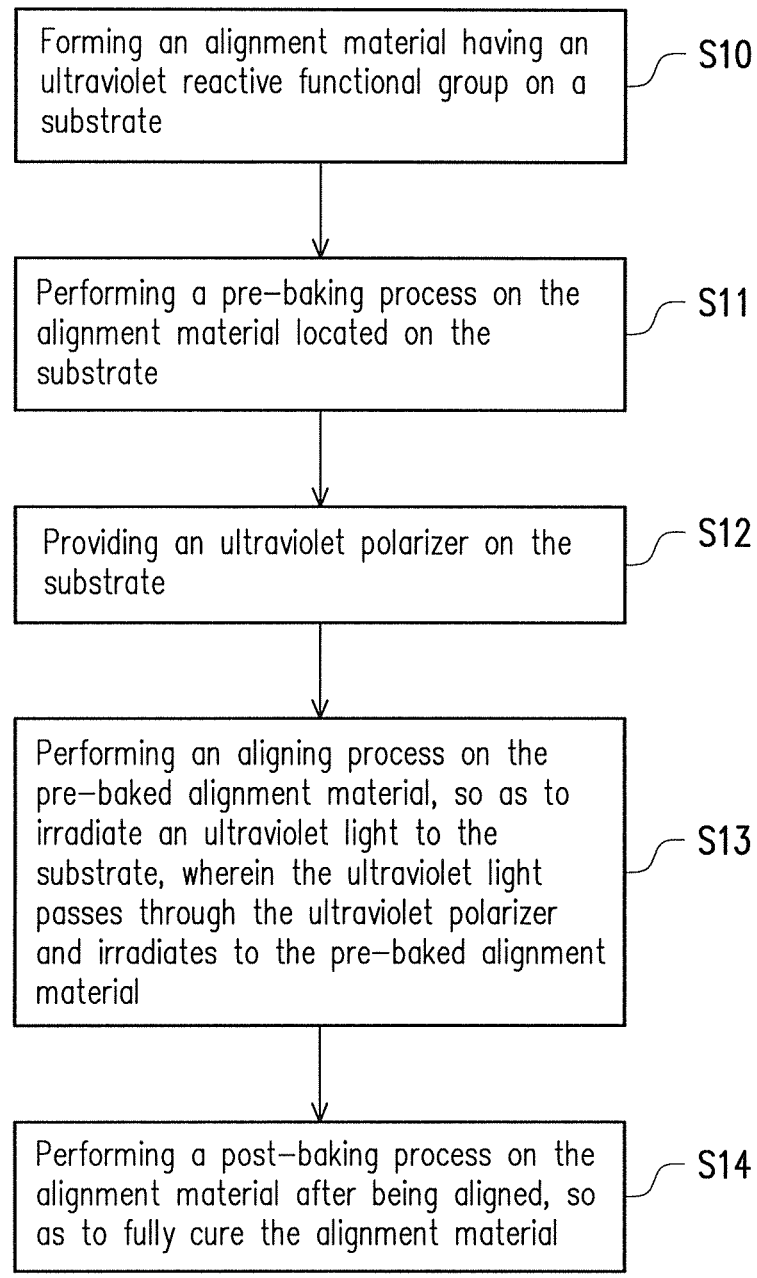
FIG. 1 schematically illustrates a flowchart diagram of a method for manufacturing an alignment layer according to an embodiment of the invention.

FIG. 1 schematically illustrates a flowchart diagram of a method for manufacturing an alignment layer according to an embodiment of the invention. FIG. 2A through FIG. 2E are schematic cross-sectional views of the method for manufacturing the alignment layer depicted in FIG. 1. Firstly, referring to FIG. 1 and FIG. 2A together, in the embodiment, an alignment material 110 having an ultraviolet reactive functional group is formed on a substrate 100. In the embodiment, the material of the alignment material 110 can be a polymeric material having a photo reactive functional group, such as polyimide or polyamide acid. The substrate 100 can be a colour filter substrate or an active device array substrate.

It is noted that, before the alignment material 110 is formed on the substrate 100, a cleaning process can be performed firstly on the substrate 100, which may also effectively enhance the product reliability of the alignment layer formed subsequently, besides the bondability between the alignment material 110 and the substrate 100 is increased.

Figure 2A:
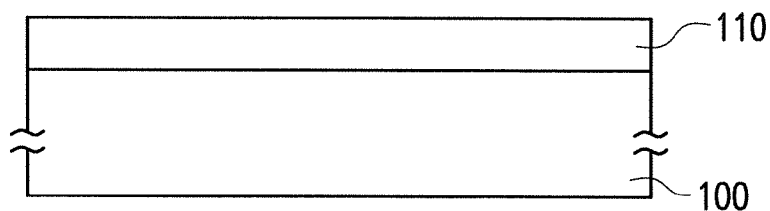
FIG. 2A through FIG. 2E are schematic cross-sectional views of the method for manufacturing the alignment layer depicted in FIG. 1.
Figure 2B:
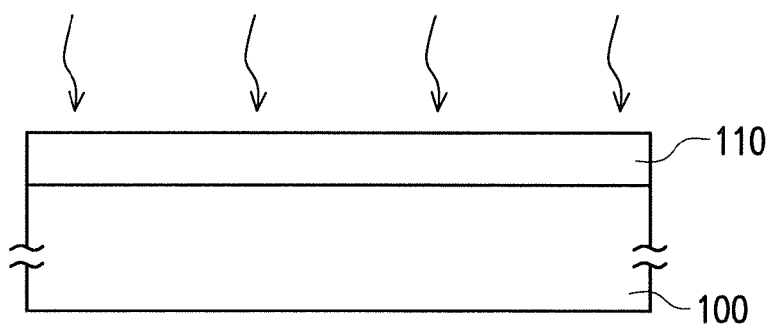

Subsequently, referring to FIG. 1 and FIG. 2B together, a pre-baking process is performed on the alignment material 110 located on the substrate 100, so as to remove a portion of the solvent (not shown) in the alignment material 110 but the alignment material 110 will not be fully cured. Herein, the duration of the pre-baking process is between 1 minute and 30 minutes, and the temperature of the pre-baking is between 50° C. and 150° C.

Figure 2C:
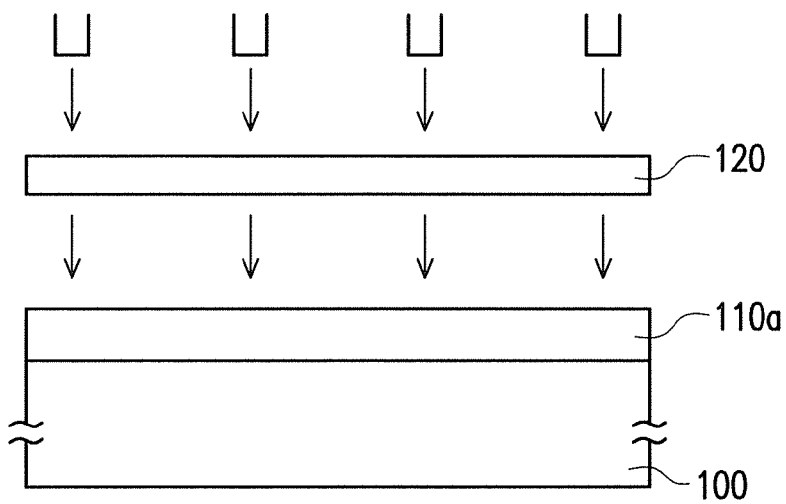
Figure 2D:
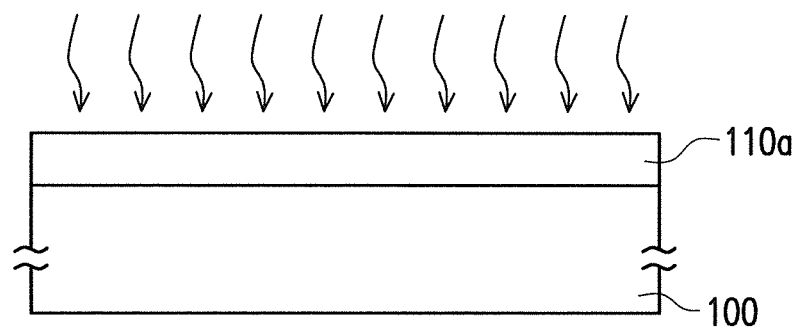
Figure 2E:
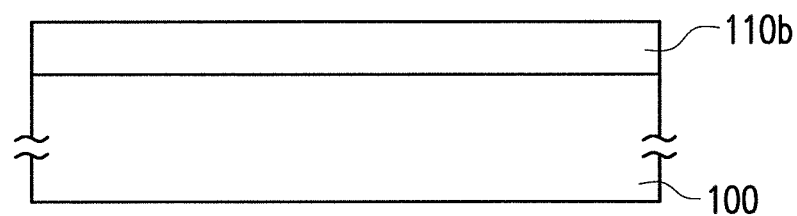

Thereafter, referring to FIG. 1 and FIG. 2C together, an ultraviolet polarizer 120 is provided on the substrate 100. Herein, it is noted that the ultraviolet polarizer 120 can be a metal phase wire grid polarizer which has high thermal resistance, where the adopted metal thereof can be gold or aluminium. The metal phase wire grid polarizer is a row of finely spaced metal slits (which are usually equal to about the wavelength of the UV light) that are fabricated on a surface of the substrate using metal. The light beams perpendicular to the metal slits and polarized are able to pass through by applying the diffraction principle, and the light beams parallel to the metal slits and polarized are reflected. The non-polarized light can generate a highly linear polarized light through a polarizer with an appropriate grating period design.

Subsequently, an aligning process is performed on the pre-baked alignment material 110a, so as to irradiate an ultraviolet light U to the substrate 100. In particular, the ultraviolet light U passes through the ultraviolet polarizer 120 and irradiates to the pre-baked alignment material 110a. Herein, the ultraviolet polarizer 120 allows the ultraviolet light U to pass through in order to provide a linear polarized light source to the alignment material 110a in a certain direction. Due to the alignment material 110a having the ultraviolet reactive functional group is irradiated by the ultraviolet light U, the ultraviolet reactive functional group thereof may be cleavaged. Herein, a variation for the ultraviolet reactive functional group of the alignment material 110a is detected and obtained by a Fourier transform infrared spectrum analyzer.

More specifically, the wavelength of the ultraviolet light adopted in the embodiment is between 200 nanometers and 400 nanometers, the energy of the ultraviolet light is between 0.1 joules and 3 joules, and the irradiation time of the ultraviolet light is between 1 second and 1000 seconds. Finally, referring to FIG. 1, FIG. 2D and FIG. 2E together, a post-baking process is performed on the alignment material 110a after being aligned, so as to fully cure the alignment material 110b. Herein, the post-baking process is to fully remove the solvent in the alignment material 110a, that is, dehydration. Additionally, in the embodiment, the duration of the post-baking process is between 1 minute and 50 minutes, and the temperature of the post-baking is between 150° C. and 400° C. Here, the manufacture of the alignment layer on the substrate 100 has been completed.

For improving the yield rate of the display panel (not shown) after being assembled, the method for manufacturing the alignment layer in the embodiment further includes a washing process which is performed on the cured alignment material 110b, wherein the washing process is to wash the cured alignment material 110b via a washing solution. Herein, the washing solution is constituted of an aqueous solution (not shown) and an isopropanol solution (not shown), and the percentage by weight of isopropanol is between 15% and 60%. Furthermore, after the washing process is performed, a drying process can also be performed by an ionized air blower (not shown), infrared heating or post-baking, so as to dry the substrate 100.

In the embodiment, the method for manufacturing the alignment layer is adopted to the alignment material 110 having the ultraviolet reactive functional group. Subsequently, the ultraviolet light U passes through the ultraviolet polarizer 120 to irradiate the pre-baked alignment material 110a, and then the post-baking process is performed to cure the alignment material 110b. Therefore, the alignment material 110b of the embodiment has already been aligned before being fully cured. Thus, the alignment layer manufactured in the embodiment can have a more preferable aligning effect. Furthermore, as compared with the conventional aligning method (that is adopted to the contact type), the method for manufacturing the alignment layer in the embodiment can effectively reduce the probability of the alignment layer being damaged and prevent the poor alignment and dark state light leakage caused by the generated static electricity or the powders and particles. In brief, the method for manufacturing the alignment layer in the embodiment may have a more preferable process yield rate. In addition, with the design of the ultraviolet polarizer 120, the alignment layer can also have multi-domain alignments, thereby achieving the effect of wide view.

To sum up, in the invention, the method for manufacturing the alignment layer is adopted to the alignment material having the ultraviolet reactive functional group. The ultraviolet light passes through the ultraviolet polarizer firstly and irradiates to the pre-baked alignment material, and then the post-baking process is performed to cure the alignment material. Therefore, the alignment layer manufactured in the invention may have a more preferable aligning effect. Furthermore, as compared with the conventional aligning method (that is adopted to the contact type), the method for manufacturing the alignment layer in the invention can effectively reduce the probability of the alignment layer being damaged and prevent the poor alignment and dark state light leakage caused by the generated static electricity or the powders and particles. Accordingly, the method for manufacturing the alignment layer in the invention can have a more preferable process yield rate.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for manufacturing an alignment layer, comprising:

forming an alignment material having an ultraviolet reactive functional group on a substrate;

performing a pre-baking process on the alignment material located on the substrate;

providing an ultraviolet polarizer on the substrate, wherein the ultraviolet polarizer comprises a metal phase wire grid polarizer;

performing an aligning process on the pre-baked alignment material, so as to irradiate an ultraviolet light to the substrate, wherein the ultraviolet light passes through the ultraviolet polarizer and irradiates to the pre-baked alignment material; and performing a post-baking process on the alignment material after being aligned, so as to fully cure the alignment material.

2. The method for manufacturing the alignment layer as claimed in claim 1, wherein a duration of the pre-baking process is between 1 minute and 30 minutes, and a temperature of the pre-baking process is between 50° C. and 150° C.

3. The method for manufacturing the alignment layer as claimed in claim 1, wherein a wavelength of the ultraviolet light is between 200 nanometers and 400 nanometers, an energy of the ultraviolet light is between 0.1 joules and 3 joules, and an irradiation time of the ultraviolet light is between 1 second and 1000 seconds.

4. The method for manufacturing the alignment layer as claimed in claim 1, wherein a material of the alignment layer comprises a polymeric material having a photo reactive functional group.

5. The method for manufacturing the alignment layer as claimed in claim 1, wherein a duration of the post-baking process is between 1 minute and 50 minutes, and a temperature of the post-baking process is between 150° C. and 400° C.

6. The method for manufacturing the alignment layer as claimed in claim 1, further comprising:

performing a washing process on the cured alignment material.

7. The method for manufacturing the alignment layer as claimed in claim 6, wherein the washing process is to wash the cured alignment material via a washing solution where the washing solution is constituted of an aqueous solution and an isopropanol solution, and the percentage by weight of isopropanol is between 15% and 60%.

8. The method for manufacturing the alignment layer as claimed in claim 1, wherein the substrate comprises a colour filter substrate or an active device array substrate.

9. The method for manufacturing the alignment layer as claimed in claim 1, wherein a variation for the ultraviolet reactive functional group of the alignment material is detected by a Fourier transform infrared spectrum analyzer.

* * * * *